R. H. MANSON.
BATTERY CASE.
APPLICATION FILED SEPT. 24, 1913.
1,146,806.
Patented July 20, 1915.
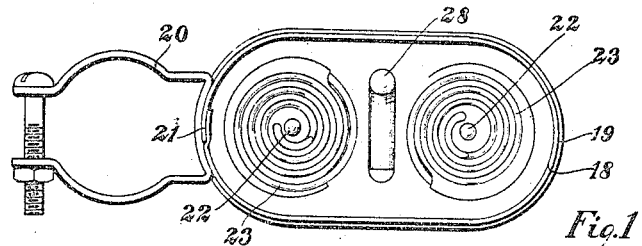
Fig. 1
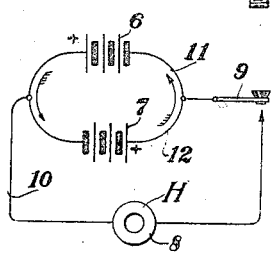
Fig. 5
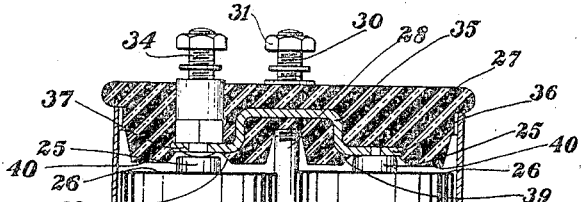
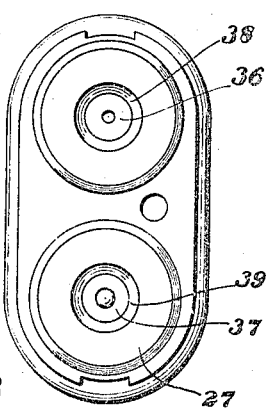
Fig. 3
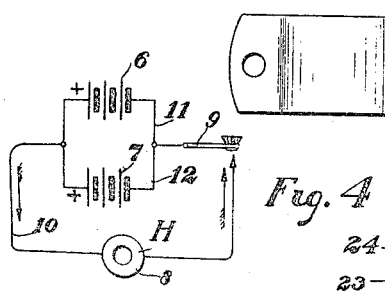
Fig. 4
Fig. 2
Witnesses
John F. Cherry
Meta Smithberger
Inventor
Ray H. Manson
By F. O. Richey
His Attorney

UNITED STATES PATENT OFFICE.

RAY H. MANSON, OF ELYRIA, OHIO, ASSIGNOR TO THE GARFORD MANUFACTURING COMPANY, OF ELYRIA, OHIO, A CORPORATION OF OHIO.

BATTERY-CASE.

1,146,806.

Specification of Letters Patent.

Patented July 20, 1915.

Application filed September 24, 1913. Serial No. 791,511.

*To all whom it may concern:*

Be it known that I, RAY H. MANSON, a citizen of the United States, residing at Elyria, in the county of Lorain and State of Ohio, have invented certain new and useful Improvements in Battery-Cases; and I do hereby declare the following to be a full, clear, and exact description of the invention, such as will enable others skilled in the art to which it appertains to make and use the same.

My invention relates to battery cases, such as are employed more especially with dry cells, and has for its object the prevention of incongruous connections among the cells.

To illustrate the objects of my invention, I will recite one particular use: In connection with the use of electric horns upon motor cycles, a suitable casing is essential to properly house and protect the small dry cells used to furnish current for the horn. These cells are frequently assembled in series connection and covered with paper or cardboard. The zinc pole of the battery is exposed at the bottom of this column of cells and the other pole at the top. The cells must be properly mounted or they may neutralize or destroy each other. The parties who handle the cells and who from time to time renew them, understand little or nothing about the cells and how they are to be connected in the circuit; consequently, a "fool-proof" arrangement is necessary to prevent the inadvertent destruction of the cells.

One of the objects of my invention is to produce an arrangement which will prevent the inadvertent destruction of the cells by improperly connecting them in the circuit.

Another object of my invention is to provide a suitable casing for housing the cells.

Other objects and uses of my invention and the invention itself will be understood from the particular description of the embodiment illustrated in the drawing.

Figure 1 is a plan view looking down into the casing with the top and cells removed. Fig. 2 is a section through the casing, showing the cells in position. Fig. 3 is a view of the bottom of the top. Fig. 4 is a diagram illustrating the proper arrangement of the cells and Fig. 5 is a diagram showing the improper arrangement.

Referring now to the drawings and to the embodiment illustrated therein, in Fig. 4 I illustrate the proper arrangement of the cells. The batteries 6 and 7 are connected in multiple series with the horn or other electro-responsive device 8, through a switch 9 and conductors 10, 11 and 12. The combined life of the cells arranged in this manner has been found, by experience, to be much longer than the combined lives of the batteries used separately. Not only is this true, but they give better service for a longer time arranged in multiple series as shown.

If the cells are inadvertently placed in the casing in opposite arrangements, that is, if one of the batteries is reversed or turned upside down, the arrangement shown in Fig. 5 will result. I have here shown the battery 7 reversed. Under these circumstances, all the current will pass through the local circuits 11 and 12 and none through the circuit 10, so that the electro-responsive device will be without current. Not only is this true, but in a short time the cells will be exhausted. So quick will this exhaustion take place, that in most instances it will occur before a test can be made upon the electro-responsive device 8.

It will readily be seen that unless some means can be produced to prevent the unskilled from connecting the batteries in opposition, it will be difficult, if not impossible, to successfully introduce into use apparatus capable of making the desirable connections shown in Fig. 4.

By the arrangement illustrated in Figs. 1, 2, and 3, it is impossible to connect the batteries as shown in Fig. 5. At 18 I show the exterior casing, here shown as substantially elliptical in cross-section, closed at the bottom with a cup 19. Suitable means for connecting the casing to the motor cycle frame or any other desired support are shown at 20, which here consists of a bracket connected by any suitable means, at 21, to the frame. Rivets or screws are preferably employed. One terminal of the circuit conductors is connected to contacts 22 which are preferably mounted on springs 23 connected to the bottom of the casing. The springs force the contacts 22 up against the poles upon the bottom of the batteries 6 and 7, which are depressed or sunk below the edge 24 of the battery of cells. The top poles 25 of the batteries are elevated above the edges 26 of the batteries. With this arrangement, if the batteries are reversed, the poles 25 engage the contacts 23. I have, however, provided an arrangement whereby the poles upon the bottom of the batteries will not engage the contacts at the top. The top of the case is shown at 27 and is held upon the case by any suitable means, such as a rod 28 extending from the bottom of the cell to which it is connected in any suitable manner at 29. The upper end of the rod is threaded at 30 and a nut 31 screwed down thereon, holding the top securely in the case. A contact-post 34 is mounted on the top, adapted to be connected to the circuit conductor leading to the electro-responsive device 8. Suitable means are provided for connecting this contact-post to the poles 25 of the batteries. I here show a member 35 embedded in the top and exposed at 36 and 37 to engage the poles 25. The contacts 36 and 37 are sunk as shown at 38 and 39 in the top.

It will be seen that if one of the batteries of cells is reversed, the depressed pole upon the bottom of the battery will be transferred to the top, and owing to the fact that the contact at the top is also depressed, there will be no engagement; consequently, it will be impossible to connect the batteries up as shown in Fig. 5. When the batteries are improperly arranged in said casing, as when they are turned upside down, the shoulders 40 upon the top 27 will prevent the contact upon the bottom of the battery engaging the contacts 36 and 37.

I claim:—

1. A casing for cells or batteries of cells having elevated contacts upon one wall of said casing to engage depressed contacts on the cells or batteries of cells and another wall of said casing having contacts sunken therein to engage elevated contacts upon said cells or batteries of cells.

2. In a device of the class described, the combination of a casing for cells or batteries of cells, cells or batteries of cells mounted side by side in said casing, contacts upon the walls of said casing to engage the poles of the battery and means on said casing to prevent the cells or batteries of cells from being connected in opposition to each other.

3. In a device of the class described, the combination of a battery casing, cells or batteries of cells arranged side by side in said casing, contacts on the walls of said casing adapted to engage the poles of said cells or batteries of cells when said cells or batteries are properly arranged in said casing, and means to prevent the engagement of such contacts with the poles of said cells or batteries when improperly arranged in said casing.

4. In a device of the class described, the combination of a battery casing, a bottom therefor having an elevated contact, a battery in said casing having an unelevated pole for engagement with the elevated contact on the casing bottom, a removable top for said casing, an electrical contact on said casing top, an elevated pole on said battery, an insulating shoulder associated with the contact on the top permitting the engagement of the contact on the top with the elevated pole and preventing its engagement with the unelevated pole of the battery, a pair of terminals on the top, means to place one of said terminals in electrical engagement with the contact on the top, a rod for placing the elevated contact on the bottom of the casing in electrical engagement with the other terminal, said rod extending through the interior of the casing, and means including said rod holding the top on the casing and said contacts in engagement with the terminals.

5. In a device of the class described, the combination of a casing for batteries, a bottom for said casing, electrical contacts on the bottom adapted to engage terminals of the batteries in the casing, a top, electrical contacts on the top for engaging terminals on the batteries in the casing, terminals carried by the top and means for holding the top in position and for placing the contacts on the bottom in electrical communication with one of the terminals on the top.

6. In a device of the class described, the combination of a casing, contacts carried by one of the walls of the casing for engaging the terminals of batteries inclosed in the casing, a top for said casing and means for placing said contacts in engagement with an electric circuit and for holding the top in position on the casing.

7. In a device of the class described, the combination of a battery casing, a contact carried by one of the walls of the casing for engaging a terminal of a battery inclosed within the casing, a removable wall in said casing, a contact carried by the removable wall for engaging the other terminal of the battery within the casing, means for placing the first named contact in electrical communication with an electric circuit and for holding the contact on the removable wall in engagement with a terminal of the battery within the casing.

8. In a device of the class described, the combination of a battery casing composed of side walls formed of a sheet of metal into substantially cylindrical shape with an elliptical cross section and a bottom and top, said top having an opening therein, electrical contacts carried by the bottom mounted in convex relation to the same and adapted to engage depressed terminals upon batteries inclosed within the casing, the top of the casing being removable, a pair of sunken electrical contacts carried by said top and adapted to engage elevated battery terminals upon the batteries mounted within the casing, a rod connected to the bottom passing through the interior of the casing and through an opening in the top, means to connect the rod to an electric circuit whereby the terminals on the bottom are placed in electrical communication with said circuit, said means adapted to hold the top in position with the sunken contacts in engagement with the elevated terminals on the batteries within the casing.

9. In a device of the class described, the combination of a casing, an electrical contact on one of the walls of the casing, the opposite wall of said casing being provided with an opening, and a terminal for an electric circuit extending through the opening in the wall and the interior of the casing and engaging the wall upon which the electrical contact is mounted.

10. In a device of the class described, the combination of battery mounting means adapted to hold a plurality of cells or batteries, cells or batteries mounted in said mounting means, electrical contacts in said mounting, means for engaging the poles of the batteries and means on said mounting means to prevent the cells or batteries of cells from being connected in opposition to each other.

11. In a device of the class described, the combination of a battery casing, means on one of the walls of the battery casing for engaging battery terminals of one polarity, a removable top for the casing, a second electrical contact on said top for engaging the battery terminal of the other polarity and means to prevent battery terminals of the wrong polarity from engaging said second contact.

12. In a device of the class described, the combination of a battery casing, a contact on the bottom of the casing for engaging the negative pole of a battery mounted within the casing, a removable top for the casing, a second electrical contact on the top for engaging a battery pole of positive polarity and means for preventing the contact on the top of the casing from engaging a battery terminal of negative polarity.

13. In a device of the class described, the combination of a battery casing, including a bottom, an electrical contact on said bottom, a top, a second electrical contact on the top and an insulating shoulder around the contact on the top, whereby the contact is protected.

14. A casing for cells or batteries of cells having elevated contacts upon one wall of said casing to engage depressed contacts on the cells or batteries of cells, and another wall of said casing having contacts sunken therein to engage elevated contacts upon cells or batteries of cells and cells held within the casing by the walls thereof with its poles in engagement with the contacts.

15. In a device of the class described, the combination of a casing for electric cells, electric cells mounted side by side in said casing, contacts in the casing to engage the poles of the cells therein and means including an insulating shoulder in said casing to prevent the cells from being connected in opposition to each other.

In witness whereof, I have signed my name in the presence of two witnesses this 19th day of September, 1913.

RAY H. MANSON.

Witnesses:
 GEO. E. ROBERTS,
 MARIAN VAUGHN.